United States Patent
Cabello (12)

(10) Patent No.: US 6,628,672 B1
(45) Date of Patent: Sep. 30, 2003

(54) SIGNALLING IN A TELECOMMUNICATIONS NETWORK

(75) Inventor: Raul Martin Cabello, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/559,786

(22) Filed: Apr. 27, 2000

(30) Foreign Application Priority Data

Apr. 30, 1999 (GB) .............................................. 9910027

(51) Int. Cl.[7] ................................................. H04J 3/24
(52) U.S. Cl. ......................... 370/474; 370/394; 370/473
(58) Field of Search ............................... 370/394–395, 370/470–476; 379/229, 230

(56) References Cited

U.S. PATENT DOCUMENTS

| | | | | |
|---|---|---|---|---|
| 5,050,166 A | * | 9/1991 | Cantoni et al. | 370/94.1 |
| 5,721,728 A | * | 2/1998 | Fowler et al. | 371/250 |
| 5,889,847 A | | 3/1999 | Copley et al. | 379/229 |
| 6,195,425 B1 | * | 2/2001 | Farris | 379/229 |
| 6,310,892 B1 | * | 10/2001 | Olkin | 370/473 |
| 6,370,388 B1 | * | 4/2002 | Vitel | 455/466 |
| 6,392,993 B1 | * | 5/2002 | Hamilton et al. | 370/230 |

FOREIGN PATENT DOCUMENTS

JP         10 304003 A         11/1998

OTHER PUBLICATIONS

Chassatte, R., International Search Report, International App. No. PCT/EP00/03755, Jul. 24, 2000, pp. 1–4.

* cited by examiner

Primary Examiner—Vivian Chin
Assistant Examiner—Tuan Tran
(74) Attorney, Agent, or Firm—Jenkens & Gilchrist, P.C.

(57) ABSTRACT

A method of reassembling an ordered sequence of Signalling Connection and Control Part (SCCP) message segments at the SCCP of a signalling node of a telecommunications network, where said message segments are received out of order at the signalling node. The method comprises the steps of receiving a first of the message segments at the SCCP and initiating a reassembly process for the sequence to which the received segment belongs. The received segment is stored in a memory as part of said initiated process, and thereafter the remaining segments of the SCCP message are also received and stored in the same memory. The received segments are then concatenated in the correct order to obtain an SCCP user data block. The reassembled SCCP user data block is passed to an SCCP user.

7 Claims, 2 Drawing Sheets

SIGNALLING IN A TELECOMMUNICATIONS NETWORK

FIELD OF THE INVENTION

The present invention relates to signalling in a telecommunications network and more particularly to the use of Signalling System number 7 (SS7) in a telecommunications network.

BACKGROUND TO THE INVENTION

In a modern telecommunications network, a considerable amount of signalling information is continually being exchanged between the Signalling Points (SPs) of the network. Examples of SPs are network switches, databases, etc. The actual signalling information being exchanged may be associated with a specific telephone call, e.g. relating to call set-up or termination, or may relate to network management functions. Complex protocols have been created to deal with the exchange of signalling information. In particular, Signalling System number 7 (SS7) defines (subject to certain national/regional variations) a suite of protocol parts (or levels) capable of dealing with modem network signalling demands.

FIG. 1 illustrates schematically the "structure" of SS7 (it will be appreciated that the SS7 parts are generally implemented by means of software running on computer processors). On top of the SS7 stack sit the user and application parts which are the entities which make use of and provide signalling information. For example, an ISDN user part (ISUP) controls the setting and control of inter-exchange connections for subscriber calls whilst a mobile application part (MAP) handles database queries in a mobile network (e.g. to determine the current location of a mobile subscriber).

At the bottom of the SS7 stack is the Message Transfer Part (MTP) which in fact comprises three distinct levels. Level 1 defines the physical, electrical, and functional characteristics of a digital signalling link. MTP level 1 has a number of different possible forms including the European standard E.1 (2048 KB/S and 32 64 KB/S channels). MTP level 2 takes care of the accurate end-to-end transmission of messages across a chosen signalling link, whilst MTP level 3 handles the routing of signalling messages between neighbouring signalling links based upon information received from higher SS7 levels concerning the final destination of a signalling message. MTP level 3 handles inter alia re-routing of messages away from failed or congested signalling links.

Routing by MTP level 3 is carried out based on a destination signalling point and subsystem number (SSN), provided to the MTP by a higher SS7 layer. In particular, for the Transaction Capabilities Application Part (TCAP), which handles database queries for the MAP, INAP etc, a Signalling Connection and Control Part (SCCP) generates the destination signalling point and subsystem number using a process termed "global title translation".

An additional important function of the SCCP in an origination node is to determine whether or not a block of data received from a user or application part is too large to be transmitted in a single SCCP message (which may be either a UniData (UDT) or an Extended UniData (XUDT) message). If the user data cannot be contained within a single UDT or XUDT message, then the SCCP segments the user data into two or more segments. In this case, each XUDT message contains a segmentation parameter which in turn contains an in-sequence delivery option flag which is set to assist in delivering the XUDT messages in the correct order to the destination node. With the in-sequence delivery option flag set, all of the associated XUDT messages should be transferred between the originating node and the destination node via the same signalling network path and consequently all of the XUDT messages should be received at the destination node in the correct order.

Operators of telecommunications networks are becoming more and more interested in sharing signalling traffic between the signalling nodes and links in order to optimise signalling traffic flow. This will involve dynamically allocating signalling traffic to signalling nodes and links depending upon capacity and availability. Operators are also becoming interested in the possibility of sending signalling traffic over IP networks, for example instead an MTP network, due to the cost advantages which IP networks provide.

SUMMARY OF THE INVENTION

In the event that operators decide to implement one or other of the above proposals, i.e. load sharing in an SS7 network or transmitting signalling traffic via an IP network, a potential problem is that SCCP segments (i.e. XUDT messages) may arrive at a destination node out of sequence. This will occur if a signalling node, either the originating node or an intermediate node, decides to change transmission links in the middle of transmitting a related sequence of segments, as segments may then be sent via different paths having different transmission times. Similarly, the very nature of an IP network means that there is no guarantee that a series of IP packets or "datagrams" will be sent via the same route. Rather, routers within an IP network will dynamically allocate datagrams to links depending upon link availability. It is noted that the problem of SCCP segments arriving at a destination node out of sequence may arise even in existing SS7 networks where, for example, a given signalling link becomes unavailable during the transmission of a sequence of related SCCP segments.

It is an object of the present invention to overcome or at least mitigate the problems associated with existing and proposed signalling networks. This and other objects are achieved at least in part by providing for the reassembly of SCCP segments at a destination node in the event that a sequence of SCCP segments are received out of order.

According to a first aspect of the present invention there is provided a method of reassembling an ordered sequence of Signalling Connection and Control Part (SCCP) message segments at the SCCP of a signalling node of a telecommunications network, where said message segments are received out of order at the signalling node, the method comprising the steps of:

receiving a first of the message segments at the SCCP;

initiating a reassembly process for the sequence to which the received segment belongs;

storing the received segment as part of said initiated process;

receiving and storing the remaining segments of the SCCP message;

concatenating the received segments in the correct order to obtain an SCCP user data block; and passing the reassembled SCCP user data block to an SCCP user.

Embodiments of the present invention enable SCCP data to be transmitted via a network which does not guarantee in-sequence delivery. As such, the network may be for example an IP network or an SS7 network using load sharing.

Preferably, the correct order of the segments is indicated by respective segmentation parameters which accompany the SCCP segments. More preferably, each segmentation parameter contains an indicator indicating the number of segments which follow the associated segment, when the segments are in the correct sequence.

Preferably, each of the segments contains a segmentation local reference which identifies the sequence to which the segment belongs, a calling party address, and/or an originating point code. More preferably, the segment reassembly process at said SCCP is identified by the segmentation local reference and one or both of the calling party address and originating point code. Upon receipt of a segment, the SCCP determines whether or not a segment reassembly process is currently in progress for the received segment using the segmentation local reference and calling party address/originating point code.

Preferably, a counter is started at the SCCP upon receipt of the first of a disordered sequence. The counter is incremented after receipt of each successive segment, and the counter is used to determine whether or not all the segments of a sequence have been received. When all the segments have been received, said concatenation of the segments is carried out.

According to a second aspect of the present invention there is provided apparatus for reassembling an ordered sequence of Signalling Connection and Control Part (SCCP) message segments at the SCCP of a signalling node of a telecommunications network, where said message segments are received out of order at the signalling node, the apparatus comprising:

memory means;

means for receiving the first of a set of SCCP message segments at the signalling node and for storing said received segment in said memory means;

means for receiving the remaining segments of the SCCP message and for storing these segments in the memory means;

processing means for concatenating the received segments in the correct order to form an SCCP user data block; and means for transferring the SCCP user data block to an SCCP user.

According to a third aspect of the present invention there is provided a Signalling Connection and Control Part of an SS7 protocol stack, the SCCP being arranged to:

receive a first of the message segments;

initiate a reassembly process for the sequence to which the received segment belongs;

store the received segment as part of said initiated process;

receive and store the remaining segments of the SCCP message;

concatenate the received segments in the correct order to obtain an SCCP user data block; and pass the reassembled SCCP user data block to an SCCP user.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

Figure 1:
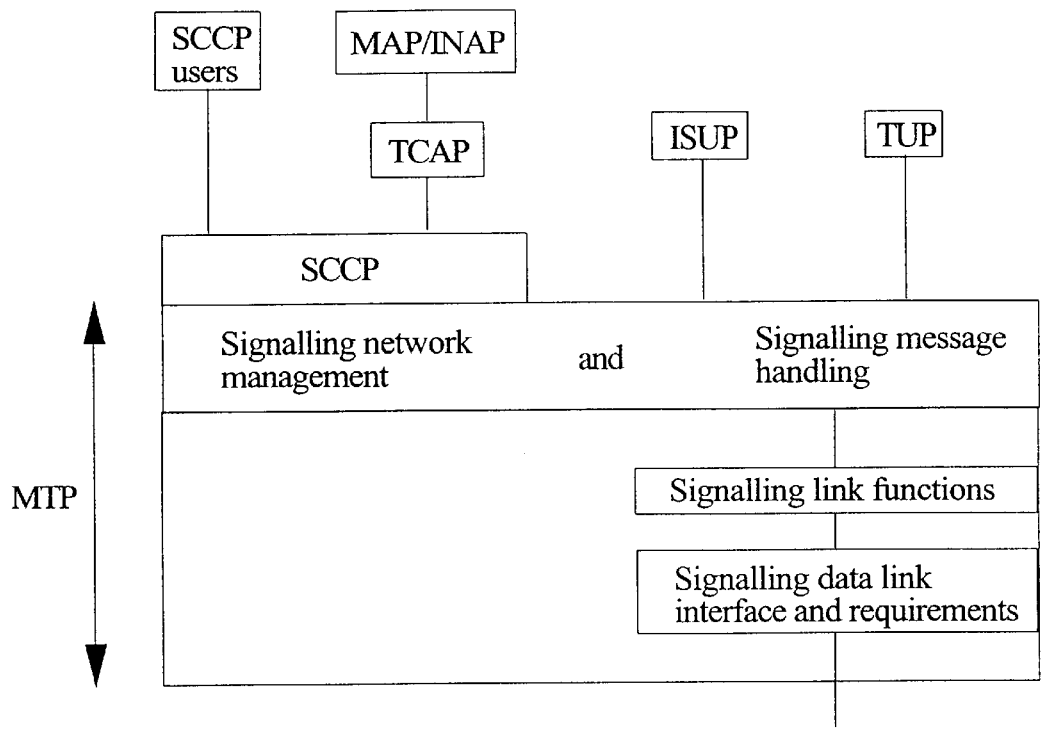
FIG. 1 illustrates schematically the protocol layers of an SS7 protocol stack.

The various layers of an SS7 protocol stack have been described above with reference to FIG. 1. The process to be described below relates to a modification of the SCCP of the SS7 stack and more particularly to a modification which allows the SCCP at a destination signalling node to correctly reassemble a segmented SCCP user data block even if the individual segments of the message are received out of order at the destination node.

Figure 2:
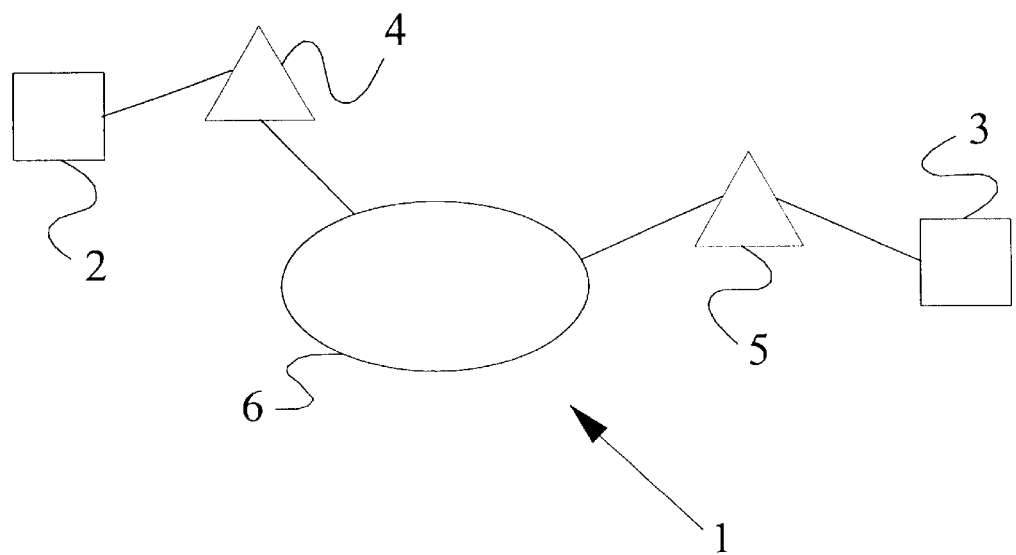
FIG. 2 illustrates schematically a signalling network of a telecommunications network.
Figure 3:
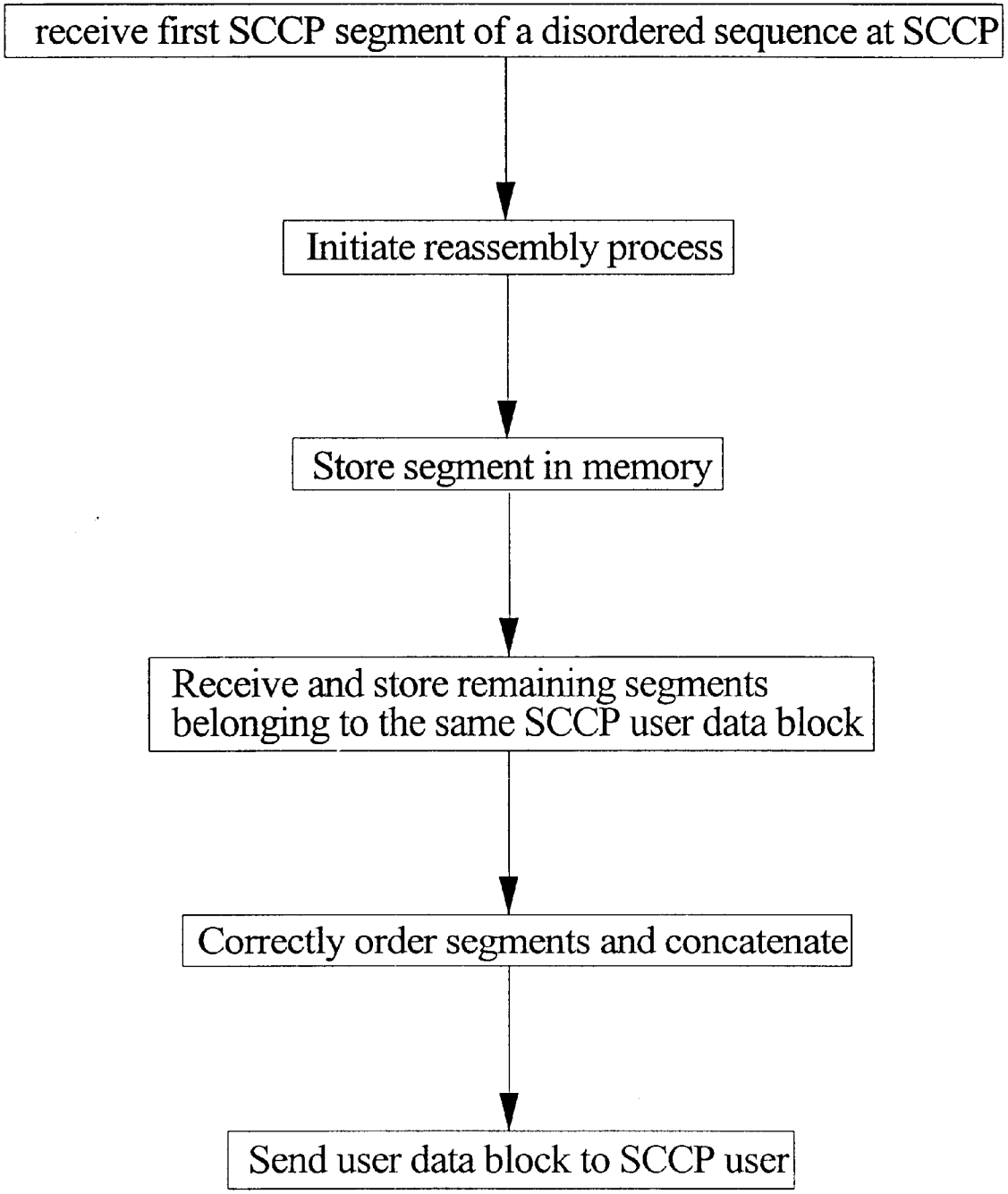
FIG. 3 is a flow diagram illustrating an SCCP message segment reassembly process at a destination node of the signalling network of FIG. 2.

FIG. 2 illustrates schematically a signalling network 1 of an overall telecommunications network in which a pair of signalling nodes 2,3 are coupled to enable signalling traffic to be transferred between the nodes 2,3. Each of the nodes 2,3 is provided with an SS7 protocol stack (see FIG. 1) to enable the nodes to transfer data between the signalling network and various different application and user parts. Each of the signalling nodes 2,3 is coupled to an SS7/IP gateway 4,5 which provide an interface between the SS7 nodes 2,3 and an IP network 6. The gateways 4,5 provide for a protocol translation between the SS7 and IP protocols and also provide for routing within the IP network 6. Such an SS7/IP network is known per se and will not be described in detail here.

In the case of a relatively large block of user data received at the SCCP of a signalling node 2 from a user part, the SCCP will segment this data block into segments of appropriate length and incorporate the segments into respective XUDT messages. Each XUDT message contains a calling party address which may comprise one or more of a global title, a signalling point code, and a subsystem number. Each XUDT message also contains routing and control information including a segmentation parameter (see below). The XUDT messages are transmitted using the MTP network to the SS7/IP gateway 4 to which the originating signalling node 2 is connected.

On the basis of addressing information which accompanies a segment (i.e. a DPC), the gateway 4 determines the IP address of the destination signalling node 3 (or rather the address of the SS7/IP gateway 5 to which the destination signalling node 3 is connected). Each SCCP segment is encapsulated into an IP datagram and may be transferred between the originating and destination SS7/IP gateways 4,5 via one of a number of different transmission paths involving various IP routers and links). The route for a given datagram is determined dynamically at the originating SS7/IP gateway 4, and also at intermediate routers, depending upon the availability of links across the IP network 6. It is therefore distinctly possible that segments belonging to a single SCCP user data block may be transmitted between the originating and destination SS7/IP gateways 4,5 via different IP transmission paths. Thus, segments belonging to a single SCCP user data block may be received out of order at the destination signalling node.

Datagrams received at the SS7/IP gateway 5 are routed to the destination signalling node on the basis of the DPCs contained in the datagrams.

As noted above, each XUDT message contains a segmentation parameter. This parameter comprises a number of subfields including: a First Segment flag which indicates whether or not the XUDT contains the first segment in the ordered segment sequence; an In-Sequence Delivery Option flag which indicates that the XUDT contains a segment of a larger user data block; a Number of Remaining Segments Indicator which, as the name suggests, indicates the number of SCCP segments following the segment contained in the XUDT in the ordered sequence; and a Segmentation Local Reference which uniquely identifies the segment series (or user data block).

At the destination signalling node 3, a reassembly process is run at the SCCP in order to recover the original SCCP user data block. Upon receipt of an XUDT with the In-Sequence Delivering Option flag set, the SCCP first of all identifies the Segmentation Local Reference contained in the segmentation parameter. As the same Segmentation Local Reference may be used simultaneously by two or more originating signalling nodes, in order to uniquely identify a segment sequence, the SCCP also determines the node associated with the XUDT message using the global title and signalling point code when they are included in the calling party address, or in the originating point code included in the MTP routing information. The SCCP then determines whether or not a reassembly process is in progress for segments containing that local reference and originating from the same originating node. If no reassembly process is in progress, the SCCP commences such a process and stores the received XUDT into memory. It is noted that the SCCP is able to determine the total number of segments belonging to an SCCP message when the XUDT is received which has the First Segment flag set, as the total number of segments will equal the (Number of Remaining Segments Indicator +1).

The SCCP monitors those reassembly processes which are in the progress at any given time, to determine when all of the segments belonging to a given SCCP user data block have been received. When the SCCP determines that all the segments of a given data block have been received, the SCCP orders the segments (extracted from the respective XUDT messages) depending upon the Number of Remaining Segments Indicators. The correctly ordered segments are then concatenated to recover the original SCCP user data block. The original SCCP block is then passed to the appropriate user part.

It will be appreciated that the SCCP at the destination node 3 may start a timer upon receipt of a first segment of a segmented SCCP user data block. If all of the segments belonging to the same block are not received within a given time, the SCCP may terminate the reassembly process and return an Error or Resend message to the originating signalling node 2.

It will be appreciated by the person of skill in the art that various modifications may be made to the above described embodiment without departing from the scope of the present invention. For example, the above description has illustrated the invention by way of a number of specific parameters which may be used to identify segments as well as the sequence of segments. These parameters may of course be changed depending upon the nature of the signalling protocol used.

What is claimed is:

1. A method of reassembling an ordered sequence of Signaling Connection and Control Part (SCCP) message segments at the SCCP of a signaling node of a telecommunications network, where each segment contains a segmentation parameter indicating the correct order of the segments and an indicator indicating the number of segments following the segment, and where said message segments are received out of order at the signaling node, the method comprising the steps of:

receiving a first of the message segments at the SCCP;

initiating a reassembly process for the sequence to which the received segment belongs on the basis of said segmentation parameter and the origin of the message segment;

storing the received segment as part of said initiated process;

receiving and storing the remaining segments of the SCCP message; concatenating the received segments in the correct order on the basis of said segmentation parameters to obtain an SCCP user data block; and passing the reassembled SCCP user data block to an SCCP user.

2. The method according to claim 1, wherein the SCCP message segments are transmitted to the destination signaling node via an IP network or an SS7 network using load sharing.

3. The method according to claim 1, wherein the SCCP determines the total number of segments in a sequence using said indicator contained in a segment having a First Segment flag set.

4. The method according to claim 1, wherein each of the segments contains a segmentation local reference which identifies the sequence to which the segment belongs and wherein the SCCP identifies the segment reassembly process using the segmentation local reference and the calling party address or MTP routing information.

5. The method according to claim 4, wherein a first received segment of a sequence is identified by determining whether or not a reassembly process is currently in progress for one or more segments of the same sequence and from the same origin.

6. The method according to claim 1 and comprising starting a counter at the SCCP upon receipt of the first of a disordered sequence, incrementing the counter after receipt of each successive segment, using said counter to determine whether or not all the segments of a sequence have been received, and, when all the segments have been received, carrying out said concatenation of the segments.

7. An apparatus for reassembling an ordered sequence of Signaling Connection and Control Part (SCCP) message segments at the SCCP of a signaling node of a telecommunications network, where each segment contains a segmentation parameter indicating the correct order of the segments and an indicator indicating the number of segments following the segment, and where said message segments are received out of order at the signaling node, the apparatus comprising:

memory means;

means for receiving the first of a set of SCCP message segments at the signaling node and for storing said received segment in said memory means;

means for receiving the remaining segments of the SCCP message and for storing these segments in the memory means;

processing means for concatenating the received segments in the correct order on the basis of said segmentation parameters and the origins of the segments to form an SCCP user data block; and means for transferring the SCCP user data block to an SCCP user.

* * * * *